(12) United States Patent
Schmid

(10) Patent No.: US 11,991,147 B2
(45) Date of Patent: May 21, 2024

(54) METHOD AND SYSTEM FOR SECURELY CONTROLLING A REMOTE MEASUREMENT DEVICE

(71) Applicant: Rohde & Schwarz GmbH & Co. KG, Munich (DE)

(72) Inventor: Bjoern Schmid, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 11 days.

(21) Appl. No.: 17/707,543

(22) Filed: Mar. 29, 2022

(65) Prior Publication Data

US 2023/0319010 A1 Oct. 5, 2023

(51) Int. Cl.
| | | |
|---|---|---|
| G06F 7/04 | (2006.01) |
| G06F 15/16 | (2006.01) |
| H04L 9/40 | (2022.01) |
| H04L 29/06 | (2006.01) |

(52) U.S. Cl.
CPC ........ H04L 63/0209 (2013.01); H04L 63/108 (2013.01)

(58) Field of Classification Search
CPC .......................... H04L 63/0209; H04L 63/108
USPC ............................................................ 726/9
See application file for complete search history.

(56) References Cited

U.S. PATENT DOCUMENTS

| | | | |
|---|---|---|---|
| 2017/0201588 A1* | 7/2017 | Schmidt ................ | H04L 63/105 |
| 2018/0077593 A1* | 3/2018 | Pelletier .............. | G01N 33/0075 |
| 2022/0038282 A1* | 2/2022 | Teramoto .............. | H04L 9/0894 |

OTHER PUBLICATIONS

"Easy and Secure Remote Access for Improved Machinery Services" <https://www.moxa.com/en/case-studies/easy-and-secure-remote-access-for-improved-machinery-services> Retrieved May 17, 2022.

"Cloud-based remote maintenance: Intelligent service concepts with the mGuard Secure Remote Service," Phoenix Contact GmbH & Co. KG, Germany <https://www.phoenixcontact.com/en-us/cloud-based-remote-maintenance> Retrieved Feb. 28, 2022.

"Secure cloud-based remote maintenance and engineering," Application Case Study by Innominate Technologies, Industrial ethernet book, Apr. 2015, pp. 42-43.

* cited by examiner

Primary Examiner — Jeffrey C Pwu
Assistant Examiner — Samuel Ambaye
(74) Attorney, Agent, or Firm — CHRISTENSEN O'CONNOR JOHNSON KINDNESS PLLC

(57) ABSTRACT

A method and a system for securely controlling a remote measurement device. A connection between at least one remote measurement device and a server, such as a server computer, connected to the Internet is established. By a firewall, the at least one remote measurement device is protected from unauthorized access via the Internet. In case of an event of the at least one remote measurement device, an event notification is sent from the at least one remote measurement device to the server via the firewall. A temporary access token is generated by the server in response to the event notification received from the remote measurement device. Access is temporarily granted to the at least one remote measurement device based on the temporary access token.

21 Claims, 3 Drawing Sheets

METHOD AND SYSTEM FOR SECURELY CONTROLLING A REMOTE MEASUREMENT DEVICE

FIELD OF THE DISCLOSURE

Embodiments of the present disclosure generally relate to a method and a system for securely controlling a remote measurement device.

BACKGROUND

In certain environments, such as production or laboratory facilities, measurement devices are used which generally have to be protected from unauthorized access. However, these days, such measurement devices are increasingly operated via remote connections which requires higher standards concerning security.

One approach to allow remote access in a controlled manner is via login and password restricted access to the respective measurement devices. However, in this case, the measurement devices are permanently reachable by a network connection. Consequently, the measurement devices may be directly accessed if the sign-in restriction is breached. Moreover, this approach comes along with a database of permanently valid login combinations either stored within the measurement devices or, at least partly, stored within remote end devices used to gain access to the measurement devices. Therefore, the protection policy is single layered in a sense that only a single protective barrier is provided. Overcoming this single barrier may potentially lead to full access to a respective measurement device.

Accordingly, there is need for a protection policy for remote controllable measurement devices which is improved when compared to existing concepts.

In particular, it is desirable to control access more reliably according to the respective needs.

SUMMARY

The disclosed subject matter satisfies this respective need and/or others. Representative embodiments are set forth in the appended claims and the following description, each of which, individually or in combination, may represent aspects of the disclosure. Some specifics of the present disclosure are described with regard to devices and others with regard to corresponding methods. However, the advantages and example embodiments described with regard to the indicated devices are correspondingly to be transferred to the according methods and vice versa.

A summary of certain embodiments disclosed herein is set forth below. It should be understood that these aspects are presented merely to provide a brief summary of these certain embodiments and that these aspects are not intended to limit the scope of this disclosure. This disclosure may encompass a variety of aspects that may not be set forth below.

According to an aspect, a method for securely controlling a remote measurement device is provided. In an embodiment, the method comprises the step of establishing a connection between at least one remote measurement device and a server device connected to a communication network, such as the Internet. Moreover, by a firewall, the at least one remote measurement device is protected from unauthorized access via the Internet. Additionally, in case of an event of the at least one remote measurement device, an event notification is sent from the at least one remote measurement device to the server device via the firewall. Subsequently, a temporary access token is generated by the server device in response to the event notification received from the remote measurement device. Furthermore, access is temporarily granted to the at least one remote measurement device based on the temporary access token.

According to another aspect, a system for securely controlling a remote measurement device is provided. In an embodiment, the system comprises at least a server device, such as a server computer, connected to a communications network, such as the Internet, at least one remote measurement device, and at least one firewall. The at least one remote measurement device is at least configured to send data to the server device via a connection established between the at least one remote measurement device and the server device. The at least one firewall is associated with the connection established between the at least one remote measurement device and the server device. The at least one firewall is configured to protect the at least one remote measurement device from unauthorized access via the Internet. In case of an event of the at least one remote measurement device, an event notification is sent from the at least one remote measurement device to the server device via the firewall. The system is configured to at least temporarily grant access to the at least one remote measurement device based on a temporary access token provided by the server device in response to the event notification.

The connection established between the at least one remote measurement device and the server device may be a secure connection. Within the present context, the secure connection may be considered a connection which is encrypted, for example the communication via the connection. The secure connection may at least be configured from being accessible without major effort such as by cracking an encryption key or rather a certificate. In case of a secure connection, a Secure Sockets Layer (SSL) connection, a Transport Layer Security (TLS) connection or a Hyper Text Transfer Protocol Secure (HTTPS) connection may be provided. Moreover, the secure connection may be based on WebSocket which is a computer communications protocol, providing full-duplex communication channels over a single TCP connection. In other words, the secure connection concerns an end-to-end encryption. Accordingly, the secure connection is different to a transparent connection like a Virtual Private Network (VPN) connection.

Compared to existing protection concepts the disclosed method and system for securely controlling a remote measurement device are improved. The option of gaining access to the remote measurement device is available only under specific circumstances. In other words, in contrast to existing concepts, the method and the system move away from the policy to provide a permanent option of gaining access to the remote measurement device or even a permanent access, especially to a complete network structure encompassing the remote measurement device. In some embodiments, only in case of an event of the at least one remote measurement device, an access token is generated that is generally required for having (remote) access to the at least one remote measurement device directly. During remaining time periods such tokens do not exist at all or have been expired and, thus, access to the at least one remote measurement device is not possible. Hence, the generated access token is only a temporary one. This means that the token becomes invalid after a specific time period and access to the at least one remote measurement device is not possible anymore after expiration of the specific time period.

In some embodiments, and in contrast to existing concepts, the disclosed method and system do not require, for example, any hardware-based components with regard to the control mechanism for providing a connection, e.g. a hardware VPN gateway. In some embodiments, only hardware components are required on which the software/program may be executed.

Accordingly, the remote measurement device may be connected to the server device or the internet in a gateway-free manner, namely without a (VPN) gateway. Hence, a tunnel connection between the server device and the remote measurement device is established rather than a VPN connection from the server device to a gateway or firewall associated with the remote measurement device.

Accordingly, there is no general prerequisite of a VPN within embodiments of the disclosed method and system.

In some embodiments, the firewall may be implemented as a pure software running on a circuit, namely a firewall circuit. The firewall may be implemented on a circuit of the device to be protected, namely the respective remote measurement device. Hence, a separate hardware device for the firewall is not necessary. However, the firewall may also be implemented on a separate device, for example a separate device that is different to a gateway. For instance, the firewall may be implemented on a router, an access point, a switch or a modem.

Put differently, the software firewall is program instructions that may be executed by the respective circuits of the participants of the internal network, namely circuits of the remote measurement device(s), or a separately formed device.

Generally, a firewall is designed for monitoring incoming and outgoing network traffic and deciding whether to allow or block specific traffic based on a set of security rules. The firewall may establish a barrier between incoming traffic from external sources (such as the Internet) and an internal network, namely the one in which the measurement device(s) is/are embedded, or rather the measurement device(s). The firewall analyzes incoming traffic based on pre-established rules and filter traffic coming from unsecured or suspicious sources to prevent attacks. Thus, the firewall guards traffic at an entry point of the respective measurement device(s), called ports, which is where information is exchanged with external devices. The firewall, e.g. the program instructions when executed, regulates traffic through port numbers and applications. Usually, ports not used are closed such that no traffic is possible via these ports.

However, the system according to embodiments of the present disclosure provides a direct access to the remote measurement device, for example via the firewall, from the server device. In contrast thereto, the remote connections of classical systems having a VPN connection terminate at the firewall/gateway.

Therefore, real measurement values (measurement data) may be forwarded from the remote measurement device via the established tunnel connection to the server device.

The disclosed method and system represent a multi-layered protective policy to protect the at least one remote measurement device. In some embodiments, a first layer of the protective policy may be considered to be represented by the firewall. A second layer may be considered to be represented by the fact that an access token is generated only in case of an event of the at least one remote measurement device. A third layer may be considered to be represented since the access token is generated by the server device instead of by the remote measurement device itself. A fourth layer is represented by the access token being valid only temporarily, i.e. for a limited time period.

Within the present context, a remote measurement device may be considered to represent a device configured to perform measurements and/or to acquire measurement values (measurement data) in respect of at least one physical quantity. For example, the remote measurement device may be configured to acquire radio frequency data in view of a device under test in order to test the device's radio frequency properties. Generally, the remote measurement device comprises at least one communication device, such as a communications circuit, such that the remote measurement device may bi-directionally communicate with the server device. In some embodiments, if access is granted to the remote measurement device, a user may be allowed to control, alter, start, or stop the respective measurement procedures or measurement parameters of the remote measurement device. Optionally, certain parameters or operation mechanisms may be prevented from being remotely accessed.

Within the present context, the server device may comprise the functionality of an interface. For example, the server device may be coupled to several remote measurement devices and communicate therewith. Optionally, the server device may comprise a master functionality with respect to remote measurements devices representing slaves in this regard. However, the hierarchy level of the server device and the remote measurement devices may also be same.

Although the server device may be coupled to a plurality of remote measurement devices (via the Internet), the generated temporary access token may be assigned to only a single remote measurement device. In other words, based on the temporary access token access may be achieved only to a single specific remote measurement device of the plurality of remote measurement devices. Accordingly, a $2^{nd}$ factor authentication procedure is provided since the temporary access token does not provide access to the entire environment connected to the server device. By the generated temporary access token, the respective tunnel connection between the server device and the dedicated remote measurement device is established. In other words, it is the server device (and optionally also the firewall) that temporarily grant access to the at least one remote measurement device based on the temporary access token.

The server device may represent a cloud infrastructure to which the at least one remote measurement device is connected via a connection, for instance a secure connection. In this regard, a secure connection may be considered to be encrypted, for example the communication via the secure connection. Decrypting the connection between the at least one remote measurement device and the server device may only be possible by the remote measurement devices and the server device (and optionally the firewall) since only these devices comprise the respective encryption and/or decryption keys.

Within the present context, a firewall may be considered to represent a software and/or or hardware based implementation of a security system that protects the at least one remote measurement device from unwanted remote access. In some embodiments, the firewall may be configured to control data communication to the communication device of the at least one remote measurement device.

A communication to the at least one remote measurement device from a user device may only be possible via the server device. The server device establishes two secure connections, namely to the at least one remote measurement device and to the user device. In other words, a direct communication from a user device to the at least one remote measurement device via the firewall omitting the server device is not possible. In this regard, the at least one remote measurement device, the firewall, and the server device may be considered to be coupled in series. However, it is not the same connection that is only routed over the server device, but two separate tunnel connections are established.

Within the present context, an event of the at least one remote measurement device may be considered to represent a specific state of the at least one remote measurement device which requires an input, for example a remote input. For example, the event may represent an error state of the at least one remote measurement device which needs to be remedied. Also, the event may be manually initiated, for example by pressing a specific button. Thereby, personnel being present at the location of the at least one remote measurement device may indicate that remote operation is required. Furthermore, the event may also represent specific states of a measurement procedure performed by the at least one remote measurement device. For example, if a specific measurement procedure has ended, such an end may represent an event which requires a remote input to specify how the at least one remote measurement device shall subsequently operate.

Within the present context, the event notification may be considered to represent a message sent in a suitable form from the at least one measurement device to the server device via the firewall. Various implementations of such event notifications may be considered, such as an email. In some embodiments, the event notification may comprise information with regard to the event of the at least one remote measurement device in response to which the event notification is sent.

Within the present context, the temporary access token may be considered to comprise information for a user how access to the at least one remote measurement device may be gained via the firewall. For example, the temporary access token may comprise login data. In response to using the temporary access token, the firewall may be configured to release a communication connection to the at least one remote measurement device for a respective user. Of course, the firewall may be configured to simultaneously block other connection attempts from users which do not present the temporary access token.

Optionally, the access may be temporarily granted if the temporary access token is presented at a configuration device connected with the server device. Generally, the access may be granted by the server device establishing the direct (tunnel) connection to the remote measurement device. Moreover, the access may also be granted by the firewall protecting the at least one remote measurement device from unauthorized access via the Internet. This means the firewall may optionally be configured to at least temporarily grant access to the at least one remote measurement device based on the temporary access token if the temporary access token is presented at the configuration device connected to the server device which in turn tries to establish the (tunnel) connection via the firewall. Therefore, an additional security layer is implemented within the protection concept since the entity at which the temporary access token is to be presented is separate from the server device.

For example, while the configuration device may be publicly accessible, the server device may be prevented from public access. In other words, the server device may be "hidden" with respect to the Internet. Accordingly, only the configuration device needs to be configured and prepared for public access. Consequently, the expenses for preparation of the configuration device may be lower as compared to the case in which the server device would be required to be prepared for public access.

Since the configuration device is connected with the server device, a user may be securely authenticated in the cloud and subsequently allowed to execute commands on their respective assigned at least one remote measurement device. Advantageously, a direct authentication at the at least one remote measurement device is avoided.

Optionally, a web-enabled end device may be part of the system. The web-enabled end device may be configured to receive the temporary access token generated by the server device. For example, the temporary access token may be provided to the web-enabled end device via a user notification. In other words, the temporary access token may be transmitted by the server device to a web-enabled end device connected to the server device by a user notification. In this regard, the user notification which is initiated from the server device may also be sent from an auxiliary device connected thereto, such as an email server. This allows the server device to remain "hidden" with regard to the Internet.

The web-enabled end device also establishes a secure connection with the server device by a tunnel connection. Accordingly, the web-enabled end device has a direct tunnel connection to the server device, whereas the server device has a direct tunnel connection to each of the measurement devices, for example through the firewall.

This ensures that the real measurement values, namely the real measurement data, can be forwarded from the respective measurement devices to the web-enabled end device via the two secure tunnel connections established between the respective measurement devices and the server device as well as between the server device and the web-enabled end device.

The web-enabled end device as well as the measurement device(s) may each comprise a packing circuit capable of packing data packets and an unpacking circuit capable of unpacking data packets.

Within the present context, a web-enabled end device may be considered to represent a user device capable of communicating via the Internet, for example by a browser functionality. In some embodiments, the web-enabled end device may represent a device a user would use to seek access to the at least one remote measurement device. In some examples, the web-enabled end device may comprise a computing device, such as a mobile phone, a tablet, a mobile PC or the like.

Accordingly, the web-enabled end device is enabled to establish the secure connection to the server device, e.g. by a software/program instructions running on the web-enabled end device.

Optionally, the event notification may be outputted at a human-machine interface of the at least one remote measurement device and/or the user notification may be outputted at a human-machine-interface of the web-enabled end device. Therefore, the event and user notifications may be recognized at various different locations, such as the facility where the at least one remote measurement device is located or the location where the user stays.

The user notification may comprise recognizable information, such as sounds or images. In some embodiments, the human-machine-interface may comprise a visualizing device, such as a display.

Optionally, the user notification may comprise the event notification. In an alternative, the event notification and the user notification may be same. Alternatively or additionally, the user notification may comprise a web address.

Access to the web address may be login and password restricted. This provides the possibility to generate respective web addresses, through which access to the at least one remote measurement device may be gained, only under specific circumstances, such as in response to an event of the at least one remote measurement device. If no event of the at least one remote measurement device occurred, the web address may not be accessible at all. For example, in such situations the web address may be disabled. Also, this provides the possibility to generate web addresses depending on the temporary access token. In other words, the respective address of the web address may not be used for different temporary access tokens. Spoken differently, each temporary access token may have a single distinct web address associated thereto. The respective web address may concern the connection established between the server device and the remote measurement device provided that access to the remote measurement device is permitted.

In some examples, the temporary access token may be generated based on a human-machine-interaction with the at least one remote measurement device. This means that the possibility of remote access to the one remote measurement device is provided only if a human-machine-interaction took place beforehand. Consequently, the protective concept of securing the at least one remote measurement device comprises an additional layer since the human-machine-interaction may be required to initiate the possibility of remote access to the at least one remote measurement device. For example, for a remote measurement device located in the production facility, maintenance personnel (at place) may be required to perform the human-machine-interaction to allow remote users having the possibility to gain access to the at least one remote measurement device at all.

According to some embodiments, the human-machine-interaction comprises one of a hardware-based interaction, such as a button, with the at least one remote measurement device or a software-based interaction with a graphical user interface (GUI) associated to the at least one remote measurement device. While a hardware button provides even enhanced security since it requires a manual activation, a software-based interaction with a GUI may be more convenient in certain situations and, thus, more user friendly.

Optionally, external access to the at least one remote measurement device is preventable based on at least one switch associated with the at least one remote measurement. The at least one switch may be implemented in software and/or hardware. In some embodiments, the switch is a hardware switch. In other words, the at least one remote measurement device may comprise a button or the like which is configured to prevent any external access to the at least one remote measurement device. This security mechanism may prevent a web-enabled end device to access the at least one remote measurement device at all. Also, this security mechanism may optionally prevent a communication between the at least one remote measurement device and the server device. In other words, a communication device of the at least one remote measurement device may be disabled if the at least one switch device is activated.

According to some embodiments, the access is only granted for a predefined time period and blocked automatically after expiration of the predefined time period. Such a time limitation may be implemented based on the access token which may only be valid temporary, i.e. for a limited time period. Furthermore, after having initiated an event notification, remote access to the at least one remote measurement device may be possible only for a limited amount of time. Several other mechanisms to timely limit remote access are considerable, such as the user notification being only temporary valid.

In some embodiments, the predefined limited time period during which the temporary access token may be valid or through which access is granted may be configurable. For example, at the server device such time periods may be adaptable according to the needs. In an alternative, the time period may also be adaptable at the firewall, the configuration device, or the at least one remote measurement device.

Alternatively or additionally, the temporary access token may represent a single-use access token. Spoken differently, once the temporary access token has been used, it may be become invalid. Repeatedly usage of the temporary access token may result in a failure. The firewall may be configured to grant access to the at least one remote measurement device only once per temporary access token.

Optionally, the at least one remote measurement device may be a stationary machine. A stationary machine may be considered a device which is usually not transported due to its parameters, such as weight and size. Also, the at least one remote measurement device may be stationary due to its purpose which may be required only at a specific location.

In some examples, the generated temporary access token may be configured to grant access to the at least one remote measurement device according to a predetermined setting and/or to become invalid if the at least one remote measurement device outputs an event notification indicating normal operation of the at least one remote measurement device. In some embodiments, the predetermined setting may comprise granting full, partial, or restricted access only. Therefore, the access may be provided according to the respective needs.

Examples of the method and system for securely controlling a remote measurement device may be fully software-implemented. In some embodiments, the firewall for protecting the connection between the remote measurement device and the server device may be fully software based. In some embodiments, the entire method may substantially require no additional hardware like a gateway for establishing the connection.

Furthermore, one, multiple or any of the user notification(s), the configuration device, the human-machine-interfaces of the at least one remote measurement device and the web-enabled end device, and the switch device for preventing external access to the at least one remote measurement device may also be software implemented in some embodiments.

In view of the procedure to control the access to the at least one remote measurement device, the entire procedure, in some embodiments, may be software-based except for the hardware components on which the software may be executed. In these embodiments, no hardware tokens or keys are required. According to these embodiments, there is no prerequisite of a virtual private network (VPN). In contrast, a secure connection is established and reliably controlled via the temporary access token in view of the event notification.

Any of the aspects mentioned hereinabove may be (sub-)combined with any other aspect provided that the skilled artisan is accordingly provided with conceivable developments.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

All of the features disclosed hereinafter with respect to the example embodiments and/or the accompanying figures can alone or in any sub-combination be combined with features of the aspects of the present disclosure including features of certain embodiments thereof, provided the resulting feature combination is reasonable to a person skilled in the art.

Figure 1:
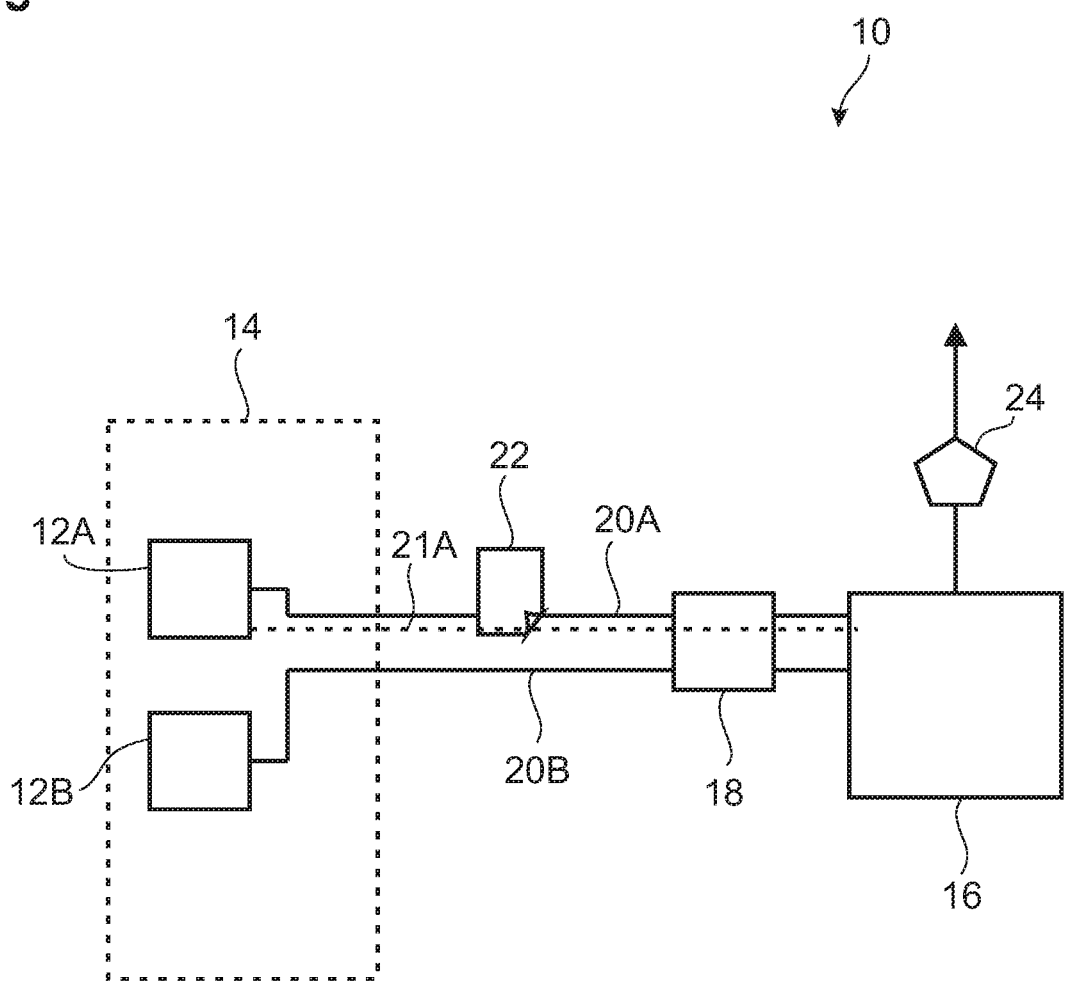
FIG. 1 is a schematic drawing of a system for securely controlling a remote measurement device according to an embodiment of the disclosure.

FIG. 1 is a schematic illustration of a system 10 for securely controlling a remote measurement device according to an embodiment of the present disclosure. As shown in the embodiment of FIG. 1, the system 10 comprises a first remote measurement device 12A, and optionally, a second remote measurement device 12B. For example, the system 10 may include only a single remote measurement device 12A. The remote measurement devices 12A, 12B are stationary and located inside a production facility 14.

Generally, the system 10 may comprise several different production facilities 14 which are located at different premises. The different production facilities 14 may each comprise several remote measurement devices 12A, 12B. In the following, reference is made to a single production facility 14.

The remote measurement devices 12A, 12B are coupled to a server computer, such as a server device 16. The server device 16 is generally coupled to a communications network, such as the Internet. Between the remote measurement devices 12A, 12B and the server device 16 a firewall 18 is arranged. Typically, the firewall 18 us associated with a production facility 14 or a part thereof, e.g. a building.

Generally, the firewall 18 is configured to protect the remote measurement devices 12A, 12B from unauthorized access, for example from unauthorized access via the Internet. In other words, the firewall 18 applies a surveillance functionality with regard to the communication connections 20A, 20B between the remote measurement devices 12A, 12B and the server device 16.

The communication connections 20A, 20B represent connections, such as a connection that uses encrypted communication standards, e.g. secure connections.

In this case, a single firewall 18 is provided for both remote measurement devices 12A, 12B. However, in other embodiments separate firewalls 18 may be associated to each of the remote measurement devices 12A, 12B.

In case of an event of a remote measurement device 12A, an event notification 22 is sent from the respective remote measurement device 12A to the server device 16 via the firewall 18 using the respective communication connection 20A. After having received the event notification 22, subsequently, a temporary access token 24 is generally provided by the server device 16, e.g. generated and sent.

The temporary access token 24 comprises information, such as login and password data, based on which access to the at least one remote measurement device 12A may be gained. The system 10, for example the server device 16 and the firewall 18, is configured to grant temporary access to the remote measurement device 12A based on the temporary access token 24, for example based on the information contained therein.

The respective access however is not granted via the already established communication connection 20A, but an additional one which is established in case the temporary access token 24 is used. The server device 16 establishes a tunnel connection 21A, for example via the communication connection 20A, that provides direct access to the remote measurement device 12A.

All shown connections may be configured according to industrial or network communication standards, such as TCP/IP or similar bus connections.

Figure 2:
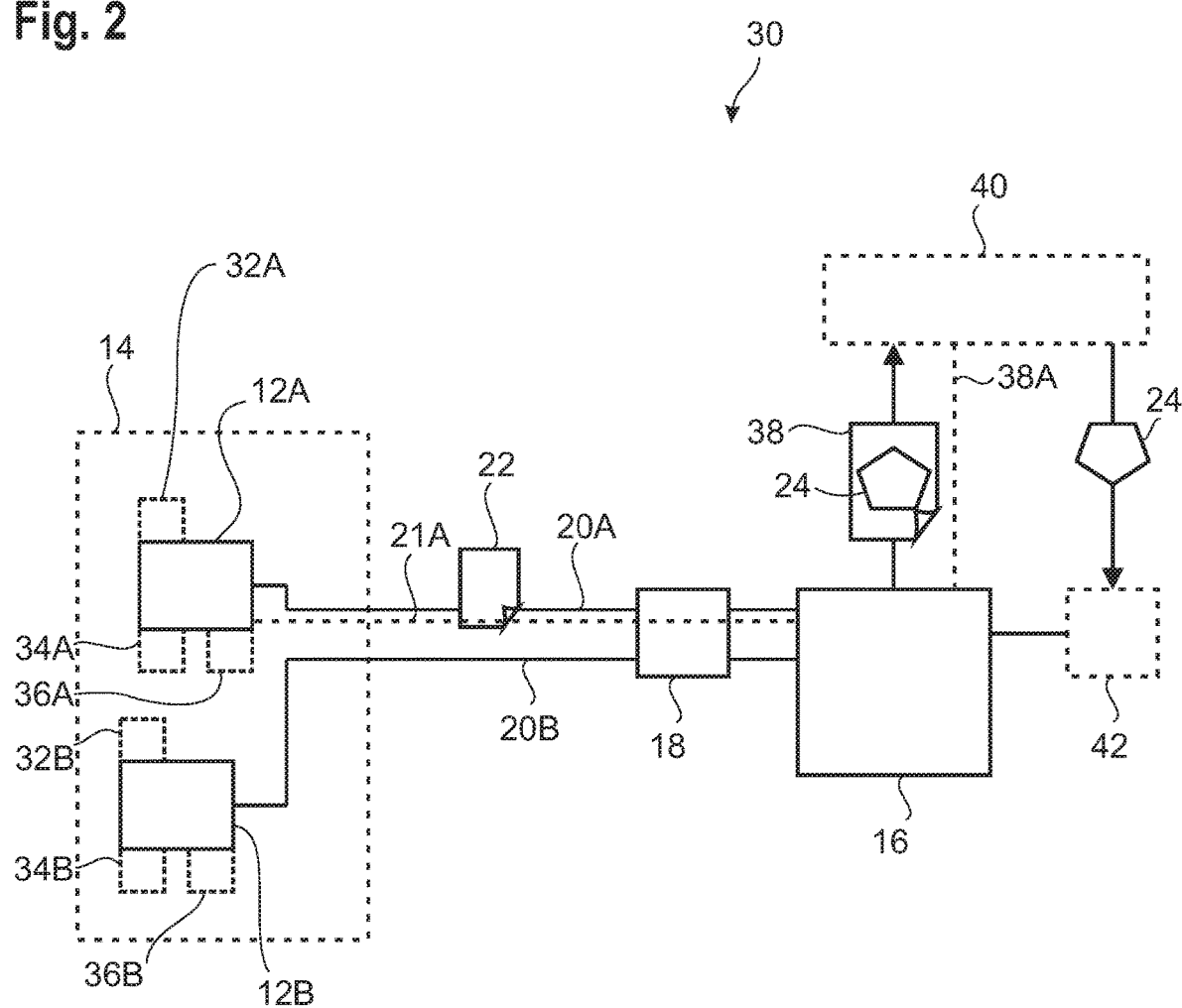
FIG. 2 is a schematic drawing of a system for securely controlling a remote measurement device according to another embodiment of the disclosure.

FIG. 2 is a schematic illustration of a system 30 for securely controlling a remote measurement device 12A according to another embodiment of the disclosure. Generally, the system 30 corresponds to the system 10, but additionally provides additional options as indicated by dashed lines.

In some embodiments, the remote measurement devices 12A, 12B comprise hardware implemented switches 32A, 32B, which are configured to prevent any external communication if activated. In other words, if the switch 32A is activated, the remote measurement device 12A may not even communicate with the server device 16. Accordingly, a communication device being part of the remote measurement device 12A may then be disabled. The switches 32A, 32B may be hardware implemented (e.g., hardware circuits). However, the switches 32A, 32B may also be software implemented, such as via a GUI of the respective remote measurement devices 12A, 12B.

Moreover, according to this embodiment, the remote measurement devices 12A, 12B each comprise a human-machine-interface 34A, 34B which are required to be activated for an event notification 22 to be sent from the respective remote measurement device 12A to the server device 16. This means, that in case of an event occurring at a specific remote measurement device 12A a human-machine-interaction with the respective remote measurement device 12A may be required in order to generate the possibility for remote access at all. The human-machine-interfaces 34A, 34B may comprise buttons, touchscreens or the like. Also, the human-machine-interfaces 34A, 34B may be software implemented such as via a GUI.

In addition, according to this embodiment, the remote measurement devices 12A, 12B comprise additional human-machine-interfaces 36A, 36B which may be configured to output the event notification 22 if an event notification 22 is generated. Accordingly, maintenance personnel being present at the production facility 14 may immediately recognize whether an event notification 22 is generated.

Optionally, the different types of human-machine-interfaces 34A, 34B, 36A, 36B may also be combined in only a single human-machine-interface for each remote measurement device 12A. The functionalities may be provided for instance via a GUI.

In the embodiment of FIG. 2, the system 30 may also comprise a web-enabled end device 40, such as a tablet, mobile phone, etc. In some embodiments, the web-enabled end device 40 is configured to communicate with the server device 16 or other devices connected thereto via the Internet or different industrial communication standard.

Once the event notification 22 is received by the server device 16, the temporary access token 24 is generated and sent from the server device 16 contained within a user notification 38 to the web-enabled end device 40. At the web-enabled end device 40 the user notification 38 may be outputted via a human-machine-interface. Optionally, the event notification 22 and the user notification 38 may be encrypted.

Granting access to the remote measurement device 12A may require authentication with the web-enabled end device 40 using the temporary access token 24 at a configuration device 42 connected to the server device 16. However, the configuration device 42 is generally separate from the server device 16. Accordingly, the authentication procedure is separated from the server device 16.

If the temporary access token 24 is successfully authenticated with the configuration device 42, the system 10, for example the server device 16 and the firewall 18, may provide access from the web-enabled end device 40 to the remote measurement device 12A for remote operations. This is done by establishing two (tunnel) connections, namely a first (tunnel) connection 38A between the web-enabled end device 40 and the server device 16 as well as a second (tunnel) connection between the server device 16 and the remote measurement device 12A which is only established by the server device 16 in case of using the temporary access token 24.

The remote measurement device 12A and the web-enabled end device 40 both may comprise packing circuits capable of packing data packets and an unpacking circuits capable of unpacking data packets such that (raw) data can be exchanged between those components of the system 10. In some embodiments, real measurement data gathered by the remote measurement device 12A can be transmitted to the web-enabled end device 40 via the (tunnel) connections established in series via the server device 16.

The temporary access token 24 may be valid only a limited time period. In some embodiments, the time period through which the temporary access token 24 is valid may generally be configurable.

Moreover, the temporary access token 24 may comprise information with regard to a web address, where a user may authenticate using the temporary access token 24. For example, the web address may assign the configuration device 42. In some embodiments, the web address may be login and password restricted. The temporary access token 24 may comprise login and password information in this regard.

Optionally, the system 10, e.g. the server device 16 and/or the firewall 18, may be configured to grant full, partial or restricted access to the remote measurement device 12A. The access type may depend on information contained within the temporary access token 24. Also, the access type may depend on the event based on which the event notification 22 was generated. In addition, the system 10 may be configured to prevent remote access to the remote measurement device 12A once the remote measurement device 12A sends an event notification 22 indicating normal operation mode of the remote measurement device 12A.

Figure 3:
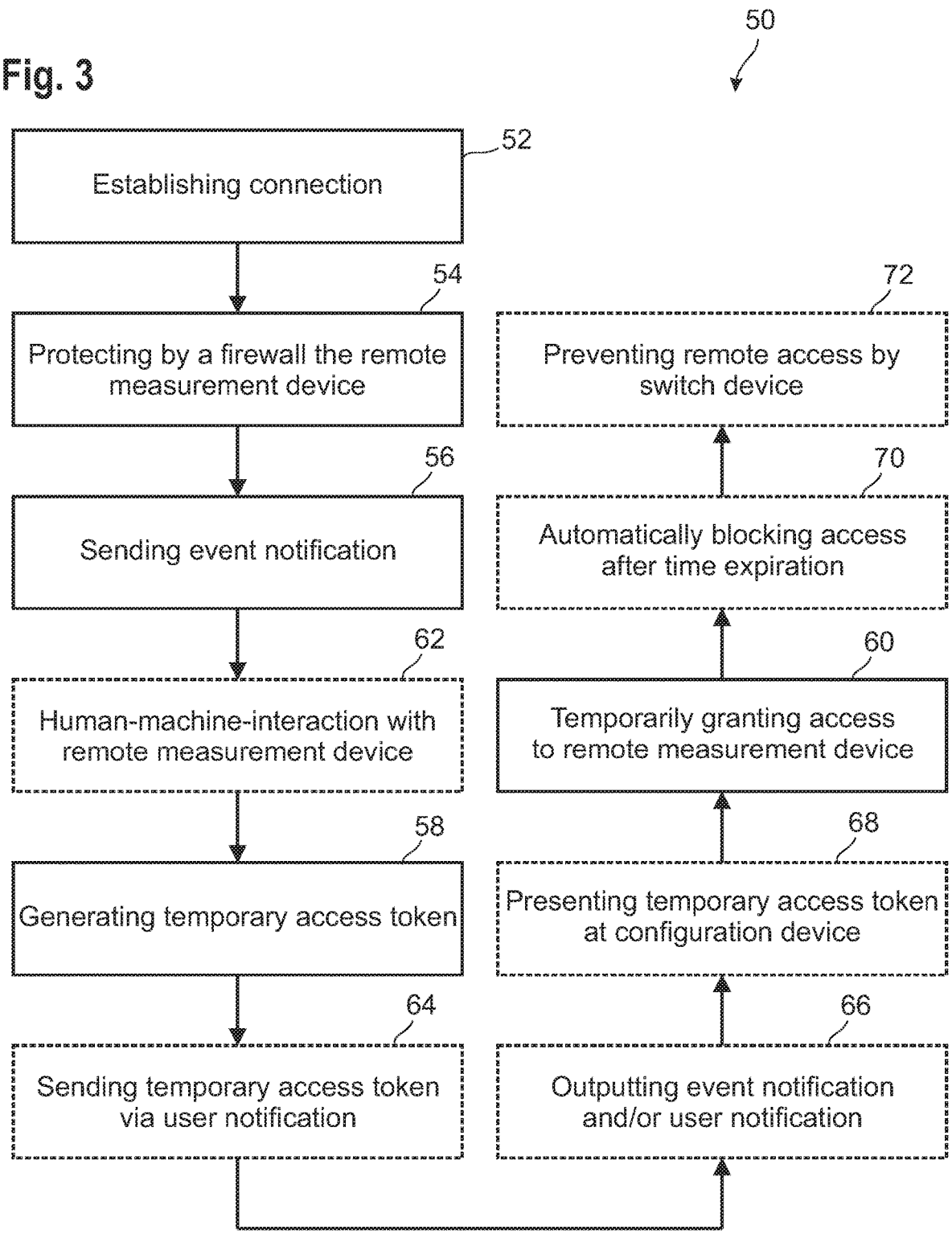
FIG. 3 is a schematic drawing of a method for securely controlling a remote measurement device according to an embodiment of the disclosure.

FIG. 3 is a schematic illustration of a method 50 for securely controlling a remote measurement device 12A according to an embodiment of the present disclosure. Optional steps, for example, are shown in dashed boxes.

The method 50 for securely controlling a remote measurement device 12A comprises at least the step 52, according to which a connection between at least one remote measurement device 12A and a server device 16 connected to the Internet is established. Moreover, in step 54 the at least one remote measurement device 12A is protected by a firewall 18 from unauthorized access via the Internet. In subsequent step 56, in case of an event of the at least one remote measurement device 12A, an event notification 22 from the at least one remote measurement device 12A is sent to the server device 16 via the firewall 18. In step 58, a temporary access token 24 is generated by the server device 16 in response to the event notification 22 received from the remote measurement device 12A. In step 60, access is temporarily granted to the at least one remote measurement device 12A based on the temporary access token 24.

In optional step 62, a human-machine-interaction with the at least one remote measurement device 12A is required for the event notification 22 to be sent. In other words, without the human-machine-interaction no temporary access token 24 is generated and remote access is not possible at all.

In optional step 64, the temporary access token 24 is provided by the server device 16 via a user notification 38. In some embodiments, the user notification 38 may be sent to a web-enabled end device 40 connected to the Internet.

In optional step 66, the event notification 22 is outputted at a human-machine-interface of the remote measurement device 12A. Furthermore, the step 66 may alternatively or additionally comprise outputting the user notification 38 at a human-machine-interface of the web-enabled end device 40.

Optional step 68 comprises the presentation of the temporary access token 24 at a configuration device 42 for the possibility to gain access to the remote measurement device 12A. In other words, the system 10, namely the server device 16 and the firewall 18, may prevent any access to the remote measurement device 12A if the temporary access token 24 is not presented at the configuration device 42 connected to the server device 16.

In optional step 70, any communication to the remote measurement device 12A is prevented by the system 10 after limited time period. The time period may represent the lasting time for the temporary access token 24. Once the time period is expired, the temporary access token 24 may have lost its validity. In some embodiments, the time period may be configurable.

In optional step 72, any communication to the remote measurement device 12A is prevented based on a human-machine-interaction with the remote measurement device 12A. For example, by activating a switch 32A of the remote measurement device 12A, a communication device of the remote measurement device 12A may be disabled.

Accordingly, the method 50 provides a multilayered protection policy for the remote measurement device 12A since several separate measures are implemented and basically independent from each other. Overcoming the protection policy would thus require cracking all those different protection measures. The level of security with regard to unauthorized remote access is greatly enhanced.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically-configured circuits, machines, apparatus, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, an embodiment of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for securely controlling a remote measurement device, the method comprising the steps of:
    establishing a connection between at least one remote measurement device and a server connected to the Internet, wherein the connection established between the at least one remote measurement device and the server is a tunnel connection which is established without a gateway;
    protecting, by a firewall, the at least one remote measurement device from unauthorized access via the Internet;
    sending, in case of an event of the at least one remote measurement device, an event notification from the at least one remote measurement device to the server via the firewall;
    generating a temporary access token by the server in response to the event notification received from the remote measurement device; and
    temporarily granting access to the at least one remote measurement device based on the temporary access token,
    wherein the event represents an error state of the at least one remote measurement device or an end of a measurement procedure performed by the at least one remote measurement device.

2. The method of claim 1, wherein the access is temporarily granted if the temporary access token is presented at a configuration device connected with the server.

3. The method of claim 1, wherein the temporary access token is transmitted by the server to a web-enabled end device connected to the server by a user notification.

4. The method of claim 3, wherein the event notification is outputted at a human-machine interface of the at least one remote measurement device and/or the user notification is outputted at the web-enabled end device.

5. The method of claim 3, wherein the user notification comprises a web address, and wherein access to the web address is login and password restricted.

6. The method of claim 1, wherein the temporary access token is generated based on a human-machine-interaction with the at least one remote measurement device.

7. The method of claim 1, wherein external access to the at least one remote measurement device is preventable based on at least one switch associated with the at least one remote measurement.

8. The method of claim 1, wherein the access is only granted for a predefined time period and blocked automatically after expiration of the predefined time period.

9. A system for securely controlling a remote measurement device, comprising: at least a server connected to the Internet, at least one remote measurement device, and at least one firewall,
    wherein the at least one remote measurement device is at least configured to send data to the server via a connection established between the at least one remote measurement device and the server,
    wherein the connection established between the at least one remote measurement device and the server is a tunnel connection which is established without a gateway,
    wherein the at least one firewall is associated with the connection established between the at least one remote measurement device and the server,
    wherein the at least one firewall is configured to protect the at least one remote measurement device from unauthorized access via the Internet,
    wherein, in case of an event of the at least one remote measurement device, an event notification is sent from the at least one remote measurement device to the server via the firewall, and
    wherein the system is configured to at least temporarily grant access to the at least one remote measurement device based on a temporary access token provided by the server in response to the event notification,
    wherein the event represents an error state of the at least one remote measurement device or an end of a measurement procedure performed by the at least one remote measurement device.

10. The system of claim 9, wherein the system is configured to at least temporarily grant access to the at least one remote measurement device based on the temporary access token if the temporary access token is presented at a configuration device connected to the server.

11. The system of claim 9, wherein the system comprises a web-enabled end device configured to receive the temporary access token generated by the server.

12. The system of claim 9, wherein the temporary access token is provided via a user notification.

13. The system of claim 12, wherein the event notification is outputted at a human-machine interface of the at least one remote measurement device and/or the user notification is outputted a web-enabled end device.

14. The system of claim 12, wherein the user notification comprises a web address, and wherein access to the web address is login and password restricted.

15. The system of claim 9, wherein the temporary access token is creatable by a human-machine-interaction with the at least one remote measurement device.

16. The system of claim 15, wherein the human-machine-interaction comprises one of a hardware-based interaction with the at least one remote measurement device or a software-based interaction with a graphical user interface associated to the at least one remote measurement device.

17. The system of claim 9, wherein the temporary access token generated is configured to grant access to the at least one remote measurement device for a predefined time period.

18. The system of claim 9, wherein the at least one remote measurement device is a stationary machine.

19. The system of claim 9, wherein the at least one remote measurement device comprises at least one switch configured to prevent external access.

20. The system of claim 9, wherein the temporary access token generated is configured to grant access to the at least one remote measurement device according to a predetermined setting and/or to become invalid if the at least one remote measurement device outputs an event notification indicating normal operation of the at least one remote measurement device.

21. A method for securely controlling a remote measurement device, the method comprising the steps of:
establishing a connection between at least one remote measurement device and a server connected to the Internet, wherein the connection established between the at least one remote measurement device and the server is a tunnel connection which is established without a gateway;
protecting, by a firewall, the at least one remote measurement device from unauthorized access via the Internet;
sending, in case of an event of the at least one remote measurement device, an event notification from the at least one remote measurement device to the server via the firewall, wherein the event represents a specific state of the at least one remote measurement device which requires a remote input, wherein the event notification represents a message sent from the at least one measurement device to the server via the firewall;
generating a temporary access token by the server in response to the event notification received from the remote measurement device; and
temporarily granting access to the at least one remote measurement device based on the temporary access token, wherein the access is not granted via the already established communication connection, but an additional connection which is established in case the temporary access token is used.

* * * * *